United States Patent
Conen et al.

(10) Patent No.: US 7,969,040 B2
(45) Date of Patent: Jun. 28, 2011

(54) DUAL BATTERY VEHICLE ELECTRICAL SYSTEMS

(75) Inventors: Mark Conen, Newmarket (GB); Daniel Benjamin Kok, Billericay (GB); Muhammad Siddiqui, Wickford (GB); Paul Taberham, Springfield Chelmsford (GB); Darren Lee Cousen, Barnsley (GB)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 12/411,895

(22) Filed: Mar. 26, 2009

(65) Prior Publication Data

US 2009/0243387 A1 Oct. 1, 2009

(30) Foreign Application Priority Data

Mar. 27, 2008 (GB) .................... 0805573.3

(51) Int. Cl.
*B60L 3/04* (2006.01)
(52) U.S. Cl. ....................................... 307/9.1
(58) Field of Classification Search ............... 307/9.1, 307/10.1, 10.3–10.7, 116
See application file for complete search history.

(56) References Cited

U.S. PATENT DOCUMENTS

| | | | | |
|---|---|---|---|---|
| 5,377,641 A * | 1/1995 | Salazar | ........................ | 123/179.4 |
| 6,794,765 B2 * | 9/2004 | Izumiura et al. | ............ | 290/38 R |
| 6,956,499 B2 * | 10/2005 | Shinada | ................... | 340/825.69 |
| 7,082,914 B2 * | 8/2006 | You, II | ......................... | 123/179.4 |
| 7,091,629 B2 * | 8/2006 | Hawkins | ....................... | 307/10.6 |
| 2006/0097577 A1 | 5/2006 | Kato et al. | | |

FOREIGN PATENT DOCUMENTS

| | | |
|---|---|---|
| JP | 2003161239 A | 6/2003 |
| JP | 2004025979 A | 1/2004 |
| JP | 2005264861 A | 9/2005 |

OTHER PUBLICATIONS

GB Search Report for the European Patent Application No. GB 0805573.3 mailed Jul. 23, 2008.

\* cited by examiner

*Primary Examiner* — Albert W Paladini
(74) *Attorney, Agent, or Firm* — Frank A. MacKenzie; Brooks Kushman P.C.

(57) ABSTRACT

A dual battery electrical system for a vehicle having an engine comprises a primary load and a secondary load and is switchable between an ON state in which the engine is running, an OFF state in which the engine is not running, a START state in which the primary load requires power to start the engine, and a PAUSE state in which the engine is not running. A first battery powers the primary load, a second battery powers the secondary load, a battery switch is closable to connect the first battery to the second battery such that both batteries can provide power to both loads. The transition to and from the OFF state is via a user activated mechanism and transition to and from the PAUSE state is via a user-independent mechanism. A controller controls operation of the battery switch when the system enters and/or leaves the PAUSE state.

19 Claims, 2 Drawing Sheets

| Key Position | Operating Mode | Sure Start - Mode A | Sure Start - Mode B | Sure Start - Mode C |
|---|---|---|---|---|
| 0 | Key - Off | Open | Open | Open |
| 1 | Accessory | Open | Open | Open |
| 2 | Ignition - Engine Off | Closed (Opens After 2 Minutes No Key Move) | Closed (Opens After 2 Minutes No Key Move) | Closed (Opens After 2 Minutes No Key Move) |
| 2 | Ignition - Engine On | Closed | Closed | Closed |
| 2 | Ignition - Engine Stop (ON to PAUSE) | Closed | Closed | Open |
| 2 | Ignition - Engine Restart (PAUSE to ON) | Closed | Closed | Open |
| 3 | Cranking | Closed | Closed | Closed |

| Key Position | Operating Mode | Sure Start - Mode A | Sure Start - Mode B | Sure Start - Mode C |
| --- | --- | --- | --- | --- |
| 0 | Key - Off | Open | Open | Open |
| 1 | Accessory | Open | Open | Open |
| 2 | Ignition - Engine Off | Closed (Opens After 2 Minutes No Key Move) | Closed (Opens After 2 Minutes No Key Move) | Closed (Opens After 2 Minutes No Key Move) |
| 2 | Ignition - Engine On | Closed | Closed | Closed |
| 2 | Ignition - Engine Stop (ON to PAUSE) | Closed | Closed | Open |
| 2 | Ignition - Engine Restart (PAUSE to ON) | Closed | Closed | Open |
| 3 | Cranking | Closed | Closed | Closed |

*Fig-2*

DUAL BATTERY VEHICLE ELECTRICAL SYSTEMS

CROSS-REFERENCE TO RELATED APPLICATIONS

This application claims foreign priority benefits under 35 U.S.C. §119(a)-(d) to GB 0805573.3 filed Mar. 27, 2009, which is hereby incorporated by reference in its entirety.

BACKGROUND

1. Technical Field

The present invention relates to dual battery electrical systems for vehicles operating in a stop/start mode.

2. Background Art

In modern vehicles a large number of electrical loads are required to be powered by one or more batteries of the vehicle. These loads generally include a starter motor used to crank the engine and may include other systems whose operation is essential for starting the vehicle, such as security systems and the engine management system. It is clearly undesirable for the battery or batteries to be drained by powering other loads such as the radio, lights, phone charger or in car entertainment systems when the vehicle ignition is off so that when the vehicle needs to be started, the battery does not have enough power to drive the starter motor. In order to avoid this situation, it is known to have a dual battery system in which two batteries are used to power a vehicle—one of the batteries being dedicated to the starter mechanism. The dedicated starter battery is switched off after it is used such that it is not in use once the vehicle has been started. Therefore the power of the battery dedicated solely to the starting mechanism is not available to power any other load while driving.

Most known vehicles have an ignition switch in the form of an ignition key which is user operated and arranged to allow a user to switch the vehicle system between an OFF state (in which the engine is off and all other electrically powered vehicle systems are also switched off), an ON state (in which the engine is running and vehicle systems are turned on) and a START state (when the ignition key is turned to crank an engine in order to provide power to a starter motor, for example).

Some newer vehicles also operate in a PAUSE state. The PAUSE state has been developed in order to provide more fuel efficient vehicle systems. The PAUSE state usually operates by virtue of a vehicle controller detecting that the vehicle has become stationary (e.g. stopped at traffic lights) and, in response, shutting down the vehicle engine until the driver wishes to move the vehicle again. This type of operation is commonly known as "stop/start" operation. In some such vehicles, certain predetermined conditions have to be met before the vehicle system enters the PAUSE state, for example a clutch may need to be raised and the transmission mechanism must be neutral. There may also be a requirement for a predetermined time period to elapse while the vehicle is stationary before the PAUSE state is entered. In any event, since the engine is not running in the PAUSE state, vehicle emissions, such as carbon dioxide emissions, can be reduced in order to provide a more efficient system per journey.

In the PAUSE state, while the engine is not running, some vehicle systems may continue to be active. These vehicle systems would not normally be active in the OFF state. Therefore there is some additional power consumption in the PAUSE state relative to the OFF state. Another distinction between the PAUSE state and the OFF state is that it is usually necessary for a user (driver) to activate the ignition key (or other equivalent mechanism) in order to move from the OFF state to the ON state or from the ON state to the OFF state. This is not the case when moving to or from the PAUSE state—instead, a vehicle controller (or other equivalent mechanism) makes a decision, usually based upon predetermined factors as discussed above, as to whether or not to enter the PAUSE state or leave the PAUSE state. This decision is automatic and does not require user input (e.g. turning of a key, pressing of a button, etc.).

SUMMARY

The invention provides an electrical system permitting efficient operation of a vehicle in a stop/start mode. In the disclosed embodiment, the electrical system for a vehicle having an engine comprises at least one primary load requiring power to start the engine, and at least one secondary load not requiring power to start the engine. The electrical system is operable in an ON state in which the engine is running, an OFF state in which the engine is not running, a START state in which the primary load is powered to start the engine, and a PAUSE state in which the engine is not running. The system further comprises a first battery powering the at least one primary load, a second battery powering the at least one secondary load, a battery switch closable to connect the first battery to the second battery such that both batteries can provide power to the at least one primary load and the at least one secondary load. The transition to and/or from the OFF state is via a user activated mechanism and transition to and/or from the PAUSE state is via a user-independent mechanism. A controller is arranged to control operation of the battery switch when the system enters and/or leaves the PAUSE state.

The disclosed system may also provide a first monitor to monitor the state of health of the first battery wherein the controller is arranged to receive and take into account the state of health information from the first monitor in order to control operation of the battery switch. The state of health information may include information on the voltage of the battery. The disclosed system may also provide a second monitor to monitor the state of health of the second battery wherein the controller is arranged to receive and take into account state of health information from the second monitor in order to control operation of the battery switch. Advantageously, the use of such state of health information in determining whether or not to close or open the battery switch prior to entering or leaving the PAUSE state allows an informed decision to be made by the controller taking into account different priorities (e.g. maintaining the first battery in as good a state of health as possible so that the likelihood of not having enough power to start the engine is minimized, or keeping the second battery in as high a state of health as possible so that the likelihood of not having enough power to provide full customer loads such as a radio or an entertainment system is minimized). Alternatively the priority may be to maintain a predetermined balance of health between the two batteries.

The primary load may be a starter motor, a security system, a fuelling system, or any system that controls access to the vehicle or starting of the vehicle.

Where the primary load is a starter motor the START state may be an engine crank state in which the engine is cranked by a starter motor. Alternatively, where the primary load is another load essential for starting the vehicle, such as the vehicle security, fuelling, or engine management system, the START state may not include cranking the engine.

The disclosed embodiment achieves effective use of the first and second batteries for their specific intended purposes. Vehicle electrical systems (e.g. radios, air conditioning systems, air blowers etc.) expect a voltage dip (or reduction in power) when an engine is cranked and started. A driver will expect this as well. Therefore, for example, a radio might cut out and become inaudible or inoperative briefly while an engine is started. This is expected. However, the driver does not expect the same phenomenon to occur when moving off after having waited at traffic lights. Therefore in a vehicle with a PAUSE state, when an engine is restarted from the PAUSE state to the ON state it can be undesirable for the voltage dip mentioned above to be present whereas it is not particularly undesirable for it to be present when moving from the OFF state to the ON state.

BRIEF DESCRIPTION OF THE DRAWINGS

Embodiments of the present invention will now be described by way of example only with reference to the accompanying drawings in which:

FIG. 2 is a table showing vehicle system states in three different embodiments of the invention.

DETAILED DESCRIPTION

Figure 1:
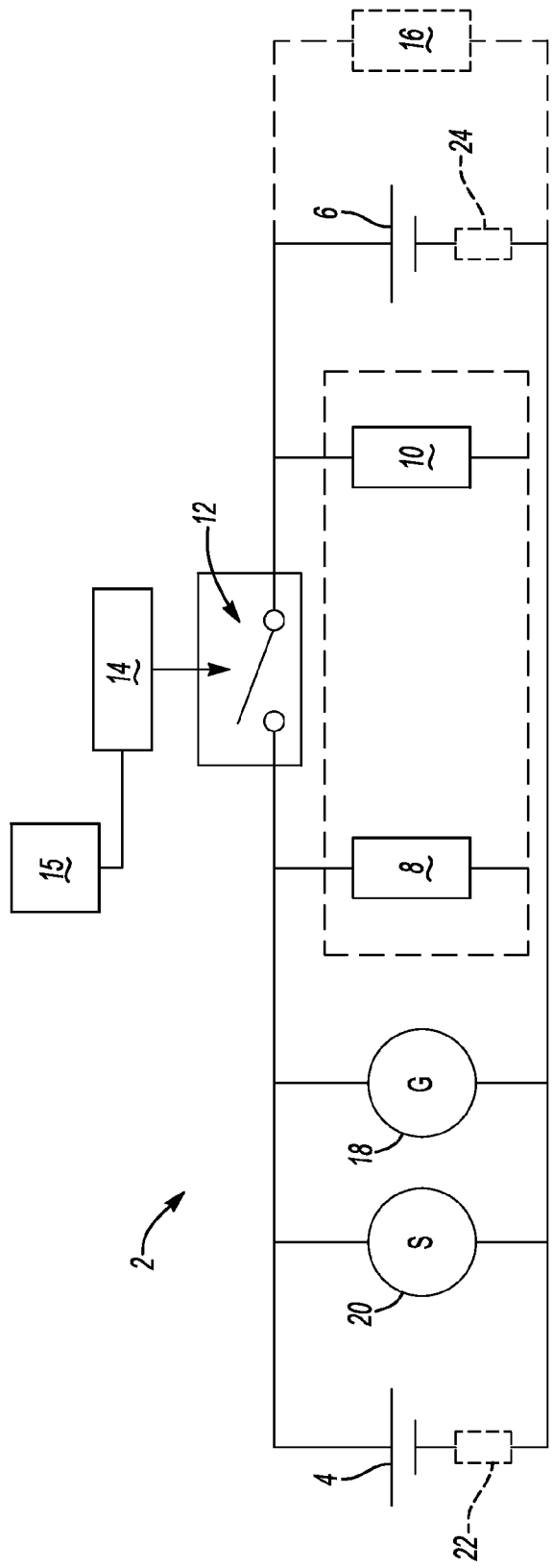
FIG. 1 is a schematic diagram of a dual battery system according to an embodiment of the invention.

Referring to FIG. 1, a dual battery electrical system 2 for a vehicle engine comprises a first battery 4 for powering primary loads 8 and a second battery 6 for powering secondary loads 10. The batteries 4, 6 are electrically connected to their respective loads 8, 10. The primary loads 8 are essential for starting the vehicle and may comprise, for example, a fuelling system, an engine management controller and/or a security system. The secondary loads 10 may comprise, for example, lights (interior and exterior), a DVD player, an in-car entertainment system and/or a mobile phone charger. The electrical system is therefore effectively divided into a primary circuit (on the left side of FIG. 1) comprising the first battery 4 and the primary loads 8, and a secondary circuit (on the right side of FIG. 1) comprising the second battery 6 and the secondary loads 10.

A battery switch 12 is connected between the positive terminals of the first 4 and the second 6 batteries. A battery system controller 14 is arranged to control operation of the battery switch 12. An ignition switch 15 (operated, for example, by a key or pushbutton) is provided to control the vehicle ignition system and is connected to the battery system controller 14. The system 2 may further comprise a number of customer connection points 16 connected to the secondary circuit and a generator 18 connected to the positive terminal of the first battery 4 and arranged to charge the batteries 4, 6 as described in further detail below.

The customer connection points 16 are arranged for powering loads added by the user after purchasing the vehicle. For example, many users modify vehicles by adding or adjusting electrical loads such as lighting loads, entertainment systems, additional power points, plug-in refrigerators etc.

The negative terminals of the first battery 4 and the second battery 6 are connected to a common electrical ground. Ignition switch 15 may be user operated (via the key or pushbutton) which is operable by a user of the vehicle to start the engine. Ignition switch 15 can be in one of three known positions corresponding to an ON state, an OFF state, and a START state which is used when a user needs to turn the system from it's OFF to its ON state and start the vehicle engine.

The system 2 also comprises a starter motor 20 which is electrically connected to the first battery 4 and which is required to be powered when the vehicle is in the START state and requires to enter the ON state.

The system 2 also comprises a first state of health monitor 22 electrically connected to the first battery 4 and arranged to monitor the state of health (e.g. the voltage) of the first battery 4. The state of health monitor 22 is arranged to communicate with the controller 14 in order to provide state of health information relating to the first battery to the controller 14. A similar second state of health monitor 24 is provided in electrical communication with the second battery 6 in order to monitor the state of health of the second battery 6 and to provide state of health information relating to the second battery 6 to the controller 14.

In other embodiments the state of health monitors may not be present. In further embodiments any other suitable connection between the state of health monitor and the battery may be provided.

Referring to FIG. 2, a number of different modes of operation of the vehicle system are possible in accordance with this invention. The different modes of operation A, B, C provide different switching events when entering or leaving the PAUSE state. On most vehicles, there are three ignition switch positions, hereinafter referred to for brevity as key positions:

In key position 0 the vehicle is entirely off and the engine is not running.

Key position 1—in FIG. 2 this is shown as "accessory" operating mode since the engine is off but the vehicle accessories (i.e. secondary loads such as the radio) can be operated.

Key position 2—the vehicle is in the ON state or in the PAUSE state. The driver is driving and while continuing driving it is not expected that the key will need to be turned.

Key position 3—this is the cranking mode which is used to turn the vehicle to the ON state initially.

It will be seen that in the exemplary modes of operation A, B, C shown in FIG. 2, in the OFF state battery switch 12 is arranged to be opened by the controller 14. This is so that power necessary for the primary loads (which are required to start the vehicle) is preserved in the first battery 4 while the vehicle is in the OFF state. For example, in key position 1, if the radio is on, the radio runs on power from the second battery 6 only and not from the first battery 4 so that if the second battery 6 becomes weak through prolonged use of the radio, then the vehicle will still be able to be started since the first battery will still be in a good state of health. Therefore when passing to the OFF state (e.g. from the ON state), battery switch 12 is opened. In some embodiments battery switch 12 may remain closed for a predetermined time before opening or may remain closed while the state of health of the first battery 4 is above a predefined threshold level.

For key position 3, during cranking, the controller 14 is arranged to close battery switch 12 in all of the examples shown in FIG. 2 since the power from the first battery 4 and second battery 6 can be combined to aid starting of the vehicle to ensure that a successful start is obtained.

In other embodiments other priorities may be provided and the controller 14 may be arranged to open or close the battery switch 12 in accordance with these different priorities. For example, in key position 1, the battery switch 12 may be closed by the controller 14 so that there is less likelihood of the second battery 6 running down and not being available to power the secondary loads if it is a priority to have more power available to the secondary loads. In a further example, it may be that the controller 14 is arranged to close the battery switch 12 in key position 1 until the first state of health monitor 22 provides information that the state of health of the first battery 4 has gone below a specified threshold. Once it goes below this threshold, the controller 14 may be arranged to open the battery switch 12 in order to preserve a certain amount of health within the first battery 4 to ensure that sufficient power will be available for the primary loads 8 and starter motor 20 before starting the vehicle.

Also in all three modes of operation A, B, C shown in FIG. 2, the controller 14 is arranged to close the battery switch 12 in key position 2 when the engine is in the OFF state in readiness for starting of the engine. If the engine is not started within two minutes then the controller 14 is arranged to reopen the battery switch 12 so that the risk of the first battery 4 losing power and not retaining sufficient power to power the starting mechanisms is minimized. In other embodiments the period of two minutes may be any other suitable time period—for example one and a half minutes or five minutes or one hour or thirty seconds. The time period may depend upon the state of health of any one of or both of the batteries.

In key position 2, while the system is in the ON state, the controller 14 is arranged to close the battery switch 12 so that the generator 18 generates power (this may be accomplished via the movement of the vehicle using regenerative braking, for example) and charges both the first battery 4 and the second battery 6. In other embodiments the controller 14 is arranged to close the battery switch 12 after a predetermined time in key position 2 or after the state of health of the first battery 4 passes above a predefined threshold level (to ensure that the first battery is recharged up to the predefined level before the second battery is charged).

When the vehicle system 2 moves from the ON state to the PAUSE state, in modes A and B the controller 14 is arranged to keep the battery switch 12 closed. In mode C, the controller 14 is arranged to open the switch. Advantageously, in mode C, the first battery 4 will not be used to power secondary loads that might be running while the vehicle is in the PAUSE state. Therefore the first battery 4 will not lose any significant power while the vehicle is in the PAUSE state and the likelihood of it losing so much power that the starting mechanism cannot be successfully operated is minimized. In modes A and B, if the second battery 6 is too weak to power the secondary loads that are running, closing the battery switch 12 provides enhanced performance of the secondary loads relative to mode C. In the normal modes of operation A, B, C the controller 14 does not take into account the state of health of the batteries 4, 6. However, in some embodiments the controller 14 may take into account the state of health information from either the first state of health monitor 22, second state of health monitor 24 or both 22, 24. For example, when moving from the ON to the PAUSE state in mode B, the controller 14 may not close the battery switch 12 if it is determined that doing so would take the state of health of the first battery 4 below a predefined threshold level (e.g. a threshold level which would indicate that subsequent starting mechanisms would be unsuccessful). For another example, in mode C, the controller 14 may not open the battery switch 12 if the state of health of the second battery 6 is judged to be too weak to power the secondary load on its own, and the state of health of the first battery 4 indicates that it is healthy enough to help to power the secondary loads while the vehicle is in the PAUSE state and also still powerful enough to power the primary loads during a subsequent starting operation.

In mode A, when the system moves from the PAUSE state to the ON state, the controller 14 is arranged to close the battery switch 12. In modes B and C, the controller 14 is arranged to open the battery switch 12 when the system moves from the PAUSE state to the ON state. Advantageously in modes B and C, the power of first battery 4 does not go to powering the secondary loads upon engine restart.

In some embodiments, the controller 14 continuously takes into account the state of health of the first battery 4 and the second battery 6 and dynamically opens and closes the switch in order to satisfy a predetermined list of priorities. For example, in one embodiment a highest priority may be assigned to keeping the first battery 4 at a very high state of health so that a starting operation is never compromised. In such an example, a lower priority may be to provide a good state of health for a second battery 6 in order to provide sufficient power for operation of secondary loads. In such a system the controller 14 will open and close the battery switch 12 as the state of health of each battery 4, 6 rises above or falls below a particular threshold, possibly relative to the other battery, or possibly in an absolute sense, if for example, the main priority is to keep a particular battery above an absolute state of health limit (e.g. a predetermined voltage).

In some embodiments the state of health monitors are not present and the controller 14 is arranged to control the operation of the battery switch 12 with predetermined opening/closing operations as the system moves from one state to another.

Various modifications may be made to the embodiments disclosed herein without departing from the scope of the invention. For example, many different types of loads may be powered by the first battery and the second battery. For example, the primary loads may include fuel system loads, anti-theft devices and other known low energy loads. The secondary loads may include radio, fog lights, drinks coolers and any other known similar loads. More than two batteries may be provided in this arrangement as long as one battery is reserved for use with the starter load and is not significantly drained when the vehicle engine is off.

There may only be a state of health monitor provided for the first battery in some embodiments. In other embodiments there may only be a state of health monitor provided for the second battery. In other embodiments there may only be one state of health monitor which monitors the state of health of both batteries.

It is an advantage of the disclosed system over vehicles having a PAUSE state without a control mechanism for operating a battery switch that, in some examples, the state of health of the first battery is not allowed to go below a predefined threshold so that power is always available for re-entering the ON state in which the engine is running.

In some embodiments the state of health of a battery, or both batteries, is inferred instead of being directly measured. This may be done, for example, by estimating the current from the generator while the vehicle is running. A state of health monitor may be provided for one of the batteries while the state of health of the other is inferred. State of health can also be inferred by measuring the voltage of the relevant battery or batteries. Any standard state of health monitoring technique can be employed in isolation or in combination with any of the techniques described above or with any other know techniques.

What is claimed:

1. An electrical system for a vehicle having an engine operable in a stop/start mode wherein the vehicle enters a PAUSE state in which the engine stops running in response at least in part to the vehicle becoming stationary and leaves the PAUSE state to resume running in response at least in part to a driver indicating a desire for the vehicle to move again, the system comprising:

at least one primary load requiring power to start the engine;

at least one secondary load not requiring power to start the engine;

a first battery powering the at least one primary load;

a second battery powering the at least one secondary load;

a battery switch having a closed condition to connect the first battery to the second battery such that both batteries can provide power to the at least one primary load and the at least one secondary load, and further having an open condition to electrically isolate the first and second batteries from one another;

an ignition switch actuatable by a vehicle operator to switch a vehicle ignition system between an OFF state in which the engine is not running, a START state in which the primary load is powered to start the engine, an ON state in which the engine is running; and a controller controlling the condition of the battery switch based upon at least: 1) whether the vehicle ignition system is in the OFF, the ON, or the START state; and 2) whether or not the vehicle is in the PAUSE state.

2. The system of claim 1 further comprising a monitor to monitor state of health of at least one of the first battery and the second battery, and wherein the controller receives and takes into account state of health information from the monitor in order to control operation of the battery switch.

3. The system of claim 2 further comprising a second monitor to monitor a state of health of the second battery, and wherein the controller receives and take into account state of health information from the second monitor in order to control operation of the battery switch.

4. The system of claim 1 wherein the controller opens the battery switch when the ignition system is in the ON state and the vehicle leaves the PAUSE state.

5. The system of claim 1 wherein the controller closes the battery switch when the ignition system is in the ON state and the vehicle leaves the PAUSE state.

6. The system of claim 1 wherein the controller opens the battery switch when the ignition system is in the ON state and the vehicle enters the PAUSE state.

7. The system of claim 1 wherein the controller closes the battery switch when the ignition system in the ON state and the vehicle enters the PAUSE state.

8. The system of claim 1 wherein the controller controls operation of the battery switch according to a list of priorities related to a state of health of at least one of the batteries.

9. The system of claim 1 further comprising a generator charging the first and second batteries when the ignition system is in the ON state.

10. The system of claim 1 wherein the primary load comprises a starter motor powered to start the vehicle when the ignition system is in the START state.

11. The system of claim 10 wherein the controller closes the battery switch, opens the battery switch, or determines whether the battery switch should be opened or closed before commencing operation of the starter motor.

12. The system of claim 1 wherein the first battery is connected to the primary load to form a primary circuit and the second battery is connected to the secondary load to form a secondary circuit, such that opening the battery switch separates the circuits from each other electrically.

13. The system of claim 1 wherein the primary load comprises at least one of an engine management controller, a security load, and a fuelling system.

14. The system of claim 13 wherein in the PAUSE state at least one of the primary loads remain active.

15. The system of claim 14 wherein a greater number of the primary loads remain active when the vehicle is in the PAUSE state than when the engine is running.

16. The system of claim 1 wherein the primary load comprises a low consumption load such that the first battery retains enough power to drive the primary load when the ignition system is in the START state.

17. The system of claim 1 wherein the secondary load comprises at least one of an interior light, a radio, an exterior light, a customer load connection point, a lighter, a mobile phone charger, a tail light, a DVD player, an in car entertainment system, and a drinks cooler.

18. A method of operating an electrical system of a vehicle having an engine operable in a start/stop mode wherein the vehicle enters a PAUSE state in which the engine stops running in response at least in part to the vehicle becoming stationary and leaves the PAUSE state to resume running in response at least in part to a driver indicating a desire for the vehicle to move again, the system comprising at least one primary load requiring power to start the engine, at least one secondary load not requiring power to start the engine, a first battery powering the at least one primary load, a second battery powering the at least one secondary load, a battery switch operable between a closed state wherein both batteries can provide power to both loads and an open state wherein the batteries are isolated from one another, and a controller arranged to control operation of the battery switch, the method comprising the steps of:

a driver using a user activated mechanism to select between an ON state of the electrical system in which the engine is running, an OFF state in which the engine is not running, and a START state in which the primary load receives power to start the engine;

the controller controlling the battery switch to select between the closed state and the open state according to: 1) the state of the electrical system; and 2) whether the vehicle is in the PAUSE state.

19. The method of claim 18 further comprising monitoring a state of health of at least one of the batteries, and wherein the controller's control or the battery switch condition is further based upon a list of priorities related to the state of health information of at least one of the batteries.

* * * * *